United States Patent
Webster et al.

(10) Patent No.: US 10,162,181 B2
(45) Date of Patent: Dec. 25, 2018

(54) DISPLAY DEVICE WITH OPTICS FOR BRIGHTNESS UNIFORMITY TUNING HAVING DOE OPTICALLY COUPLED TO RECEIVE LIGHT AT CENTRAL AND PERIPHERAL REGIONS

(71) Applicant: Microsoft Technology Licensing, LLC, Redmond, WA (US)

(72) Inventors: James Randolph Webster, Redmond, WA (US); Jeb Wu, Redmond, WA (US); Steven John Robbins, Redmond, WA (US); Tuomas Heikki Sakari Vallius, Espoo (FI); Yarn Chee Poon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 14/958,751

(22) Filed: Dec. 3, 2015

(65) Prior Publication Data
US 2017/0160547 A1 Jun. 8, 2017

(51) Int. Cl.
*G02B 27/01* (2006.01)
*G02B 27/42* (2006.01)
(Continued)

(52) U.S. Cl.
CPC .......... *G02B 27/0172* (2013.01); *G02B 5/18* (2013.01); *G02B 5/1814* (2013.01);
(Continued)

(58) Field of Classification Search
CPC ...... G02B 5/18; G02B 5/1804; G02B 5/1819; G02B 5/1828; G02B 5/1842; G02B 6/0016; G02B 6/0035; G02B 6/0036; G02B 6/0038; G02B 6/005–6/0055; G02B 6/0058; G02B 6/0061; G02B 26/0808; G02B 27/0037; G02B 27/0056; G02B 2027/0118; G02B 27/0172; G02B 27/0927; G02B 27/0944; G02B 27/4205; G02B 27/44; G03F 7/70158; G06T 19/006; G11B 7/1353
USPC .................... 359/558–576, 618, 629, 630
See application file for complete search history.

(56) References Cited

U.S. PATENT DOCUMENTS 7,027,671 B2 4/2006 Huck et al.
7,483,604 B2 1/2009 Levola
(Continued)

FOREIGN PATENT DOCUMENTS

CN 103852897 A 6/2014

OTHER PUBLICATIONS

"Waveguide-based Displays Maturing for Augmented Reality Applications", Retrieved on: Sep. 3, 2015, Available at: http://www.displaydaily.com/articles/446-sponsored-articles/14132-waveguide-based-displays-maturing-for-augmented-reality-applications.

*Primary Examiner* — Jennifer D Carruth
*Assistant Examiner* — Ryan S Dunning
(74) *Attorney, Agent, or Firm* — Arent Fox LLP (57) ABSTRACT

Introduced here is a display device that comprises a light emitter and a diffractive optical element (DOE) that is optically coupled to receive light from the light emitter and to convey the light along an optical path. The DOE may have an input surface and an output surface parallel to the input surface, where the input surface and the output surface each have a central region and a peripheral region. The DOE further may have optical characteristics such that light exiting the DOE in the peripheral region of the output surface has greater brightness than light exiting the DOE in the central region of the output surface.

19 Claims, 8 Drawing Sheets

(51) Int. Cl.
  *G06T 19/00* (2011.01)
  *G02B 5/18* (2006.01)
  *F21V 8/00* (2006.01)
  *G11B 7/1353* (2012.01)
  *G02B 27/09* (2006.01)

(52) U.S. Cl.
  CPC ......... *G02B 5/1842* (2013.01); *G02B 6/0035* (2013.01); *G02B 6/0061* (2013.01); *G02B 27/4205* (2013.01); *G02B 27/0944* (2013.01); *G02B 2027/0118* (2013.01); *G06T 19/006* (2013.01); *G11B 7/1353* (2013.01)

(56) References Cited

U.S. PATENT DOCUMENTS

| | | |
|---|---|---|
| 7,646,541 B2 | 1/2010 | Sarayeddine et al. |
| 7,773,303 B2 | 8/2010 | Chen et al. |
| 7,835,054 B2 | 11/2010 | Destain et al. |
| 8,331,006 B2 | 12/2012 | Levola |
| 8,508,848 B2 | 8/2013 | Saarikko |
| 8,773,599 B2 | 7/2014 | Saeedi et al. |
| 9,097,890 B2 | 8/2015 | Miller et al. |
| 2004/0233534 A1* | 11/2004 | Nakanishi ............ G02B 5/1809 359/572 |
| 2008/0106775 A1 | 5/2008 | Amitai et al. |
| 2008/0278812 A1 | 11/2008 | Amitai |
| 2010/0046070 A1* | 2/2010 | Mukawa ............ G02B 27/0172 359/480 |
| 2010/0135038 A1 | 6/2010 | Handschy et al. |
| 2011/0019258 A1* | 1/2011 | Levola ................ G02B 6/0035 359/238 |
| 2012/0223218 A1* | 9/2012 | Miyasaka .......... G02B 27/4266 250/216 |
| 2013/0070207 A1* | 3/2013 | Korenaga ............ G02B 17/004 353/31 |
| 2014/0198141 A1* | 7/2014 | Kasazumi ............ G03H 1/2286 345/697 |

\* cited by examiner

DISPLAY DEVICE WITH OPTICS FOR BRIGHTNESS UNIFORMITY TUNING HAVING DOE OPTICALLY COUPLED TO RECEIVE LIGHT AT CENTRAL AND PERIPHERAL REGIONS

BACKGROUND

Head-mounted display (HMD) devices have been introduced into the consumer marketplace recently to support visualization technologies such as augmented reality (AR) and virtual reality (VR). An HMD device may include components such as one or more light sources, microdisplay modules, controlling electronics, and various optics such as waveguides, lenses, beam splitters, etc.

AR and VR display technology is complex and still relatively new, however, and at present it is difficult to produce consistently high quality, realistic images in HMD devices. Often optimizing the design for certain image parameters or characteristics will have unintended adverse effects on other parameters or characteristics. One parameter that may be difficult to optimize is the spatial uniformity of brightness (intensity) of a displayed image.

SUMMARY

The technique introduced here includes a display device that comprises a light emitter and a diffractive optical element (DOE) that is optically coupled to receive light from the light emitter and to convey the light along an optical path. In certain embodiments, the DOE has an input surface and an output surface parallel to the input surface, where the input surface and the output surface each have a central region and a peripheral region. In certain embodiments, the DOE further has optical characteristics such that light exiting the DOE in the peripheral region of the output surface has greater brightness than light exiting the DOE in the central region of the output surface. In certain embodiments, the display device may be, or may be part of, an HMD device. Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

In some HMD designs, due to characteristics of the optical path, the edges of the displayed images may appear to the user to be dimmer than the center of the image. This effect is sometimes called vignetting. Such effects can reduce the realism and/or quality of the displayed images and can generally undermine the quality of the overall visualization experience for the user. Therefore, introduced here is a DOE that can be incorporated into the optical path of an HMD device or other type of display device to provide brightness uniformity tuning, which can be applied to correct for the above mentioned effect and/or other brightness non-uniformities.

In certain embodiments, the DOE has optical characteristics, including a diffraction grating and total internal reflection (TIR), that cause light exiting the DOE around the edges (periphery) of its output surface to have greater brightness than light exiting the DOE in the central region of its output surface, and in at least some embodiments, that cause light exiting the DOE around the edges of its output surface to have greater brightness than light incident upon the edges of the DOE's input surface. Advantages of this approach include that it is relatively lightweight, does not consume input data bits to the imager for purposes of brightness compensation, and does not affect exit pupil size.

Figure 1:
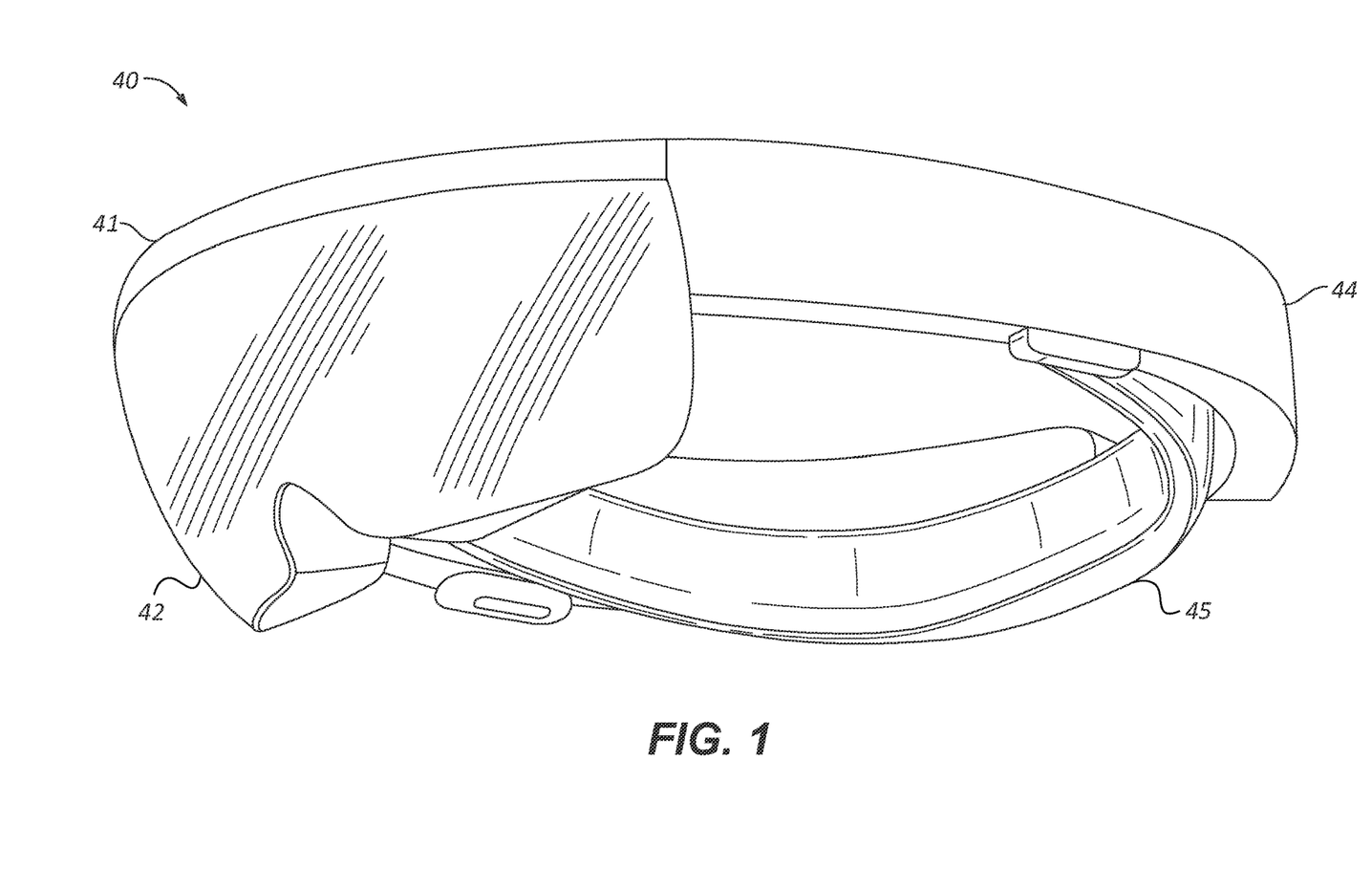
FIG. 1 shows an example of an HMD device that may include a DOE such as introduced herein.

FIG. 1 shows an example of an HMD device that can include a DOE such as mentioned above. The HMD device 40 may provide virtual reality (VR) and/or augmented reality (AR) display modes for the user, i.e., the wearer of the device. To facilitate description, it is henceforth assumed that the HMD device 40 is designed for AR visualization.

In the illustrated embodiment, the HMD device 40 includes a chassis 41, a transparent protective visor 42 mounted to the chassis 41, and left and right side arms 44 mounted to the chassis 41. The visor 42 forms a protective enclosure for various display elements (not shown) that are discussed below.

The chassis 41 is the mounting structure for the visor 42 and side arms 44, as well as for various sensors and other components (not shown) that are not germane to this description. A display assembly (not shown) that can generate images for AR visualization is also mounted to the chassis 41 and enclosed within the protective visor 42. The visor assembly 42 and/or chassis 41 may also house electronics (not shown) to control the functionality of the display assembly and other functions of the HMD device 40. The HMD device 40 further includes an adjustable headband 45 attached to the chassis 41, by which the HMD device 40 can be worn on a user's head.

Figure 2A:
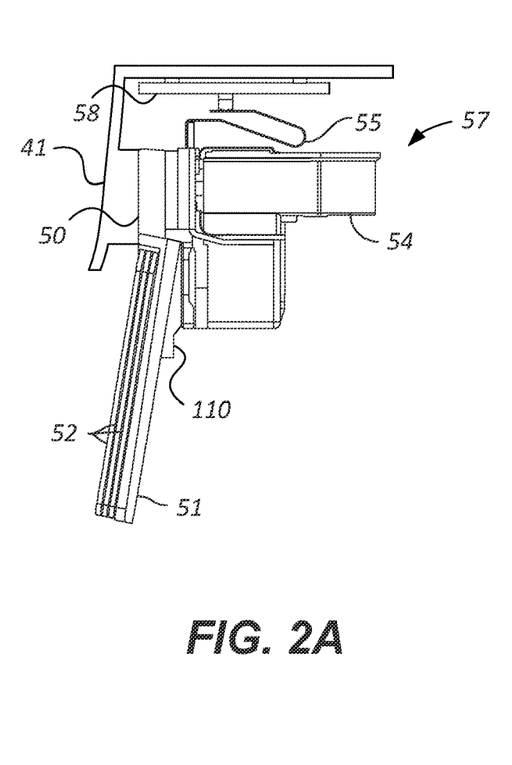
FIGS. 2A and 2B show right side and front orthogonal views, respectively, of a display assembly that may be contained within the visor of the HMD device.
Figure 2B:
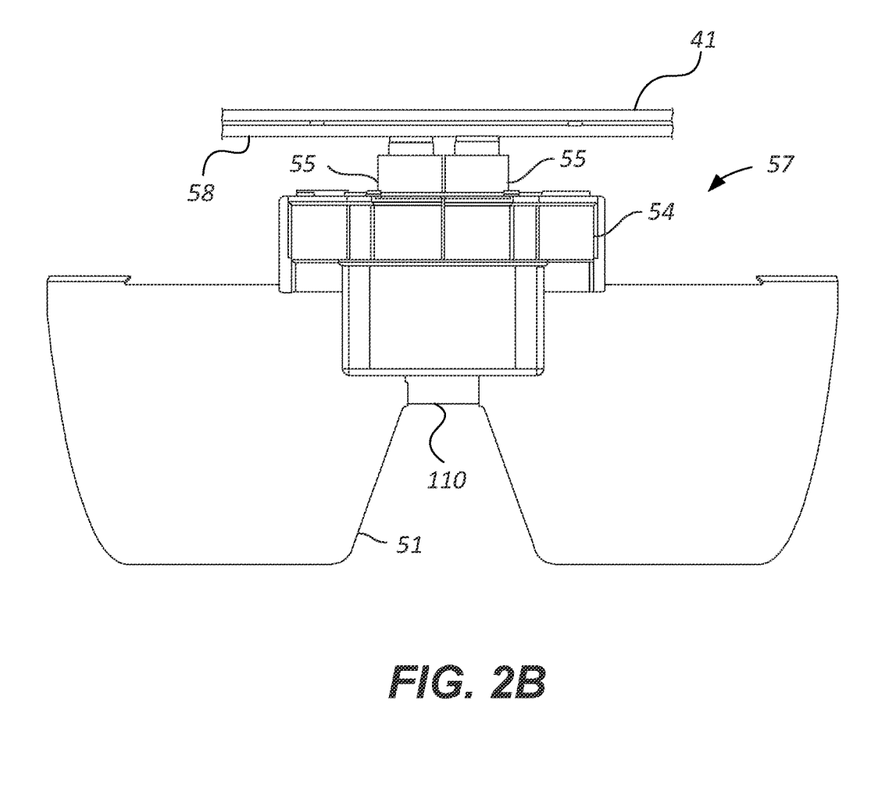

FIGS. 2A and 2B show, in accordance with certain embodiments, right side and front orthogonal views, respectively, of a display assembly that may be contained within the visor 42 of the HMD device 40. Though not shown, the user's head would be to the left of the illustrated components in FIG. 2A, and beyond the illustrated components in FIG. 2B. The display assembly 57 is mounted to the interior surface of the chassis 41. The chassis 41 is shown in cross-section in FIG. 2A.

The display assembly 57 is designed to overlay three-dimensional images on the user's view of his real-world environment, e.g., by projecting light into the user's eyes. Accordingly, the display assembly 57 includes a display engine assembly 54 that houses components such as: one or more light sources (e.g., one or more light emitting diodes (LEDs)); one or more microdisplay imagers, such as liquid crystal on silicon (LCOS), liquid crystal display (LCD), digital micromirror device (DMD); and one or more lenses, beam splitters and/or waveguides, the details of which are not germane to this disclosure. The microdisplay imager(s) (not shown) within the display engine assembly 54 may be connected via a flexible circuit connector 55 to a printed circuit board 58 that has image generation/control electronics mounted on it.

The display assembly 57 further includes a transparent waveguide carrier 51 to which the display engine assembly 54 is mounted, as well as multiple transparent waveguides 52 for each of the left eye and right eye of the user. The waveguide carrier 51 has a central nose bridge portion 110, from which its left and right waveguide mounting surfaces extend. Multiple waveguides 52 are stacked on each of the left and right waveguide mounting surfaces of the waveguide carrier 51, to project emitted light that forms images into the left eye and right eye, respectively, of the user. The entire display assembly 57 is mounted to the chassis 41 through a center tab 50 located at the top of the waveguide carrier 51 over the central nose bridge section 110.

Figure 3A:
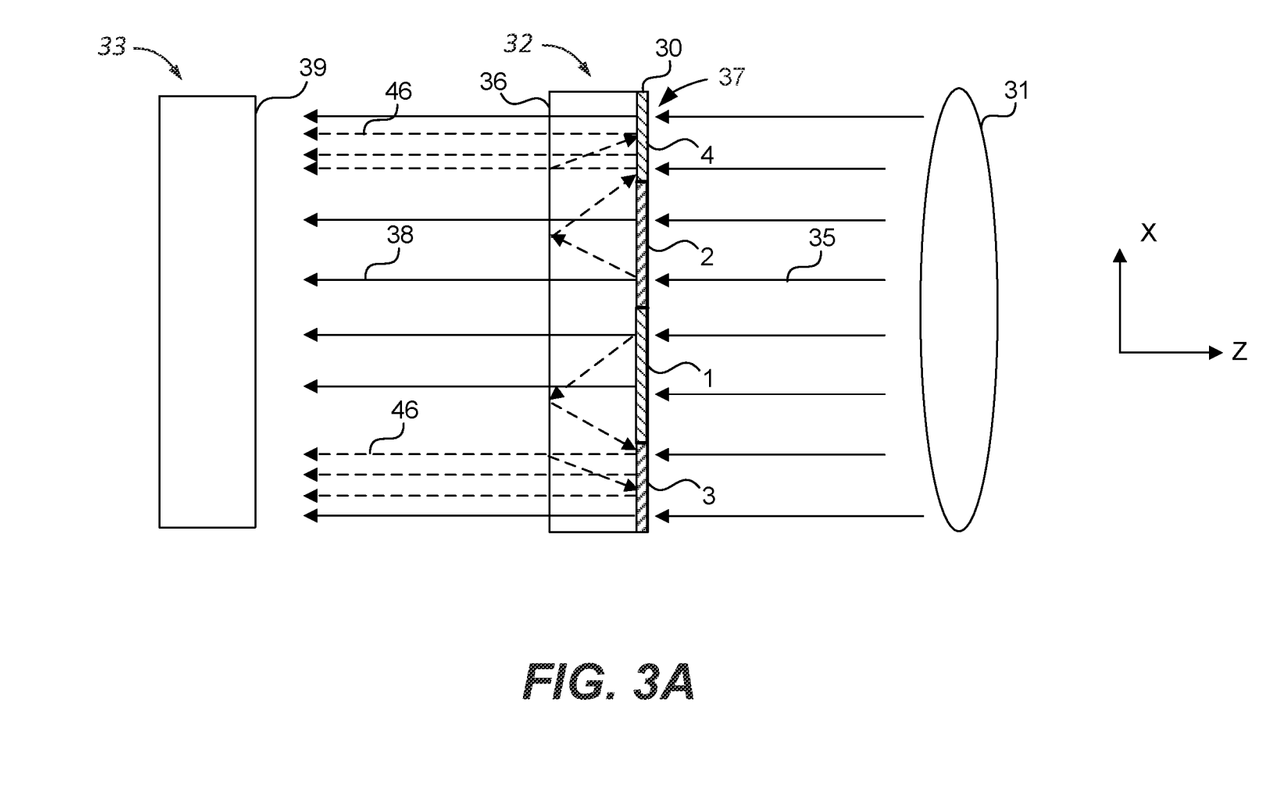
FIG. 3A schematically illustrates how a DOE according to a first embodiment can be used to tune brightness uniformity.
Figure 3B:
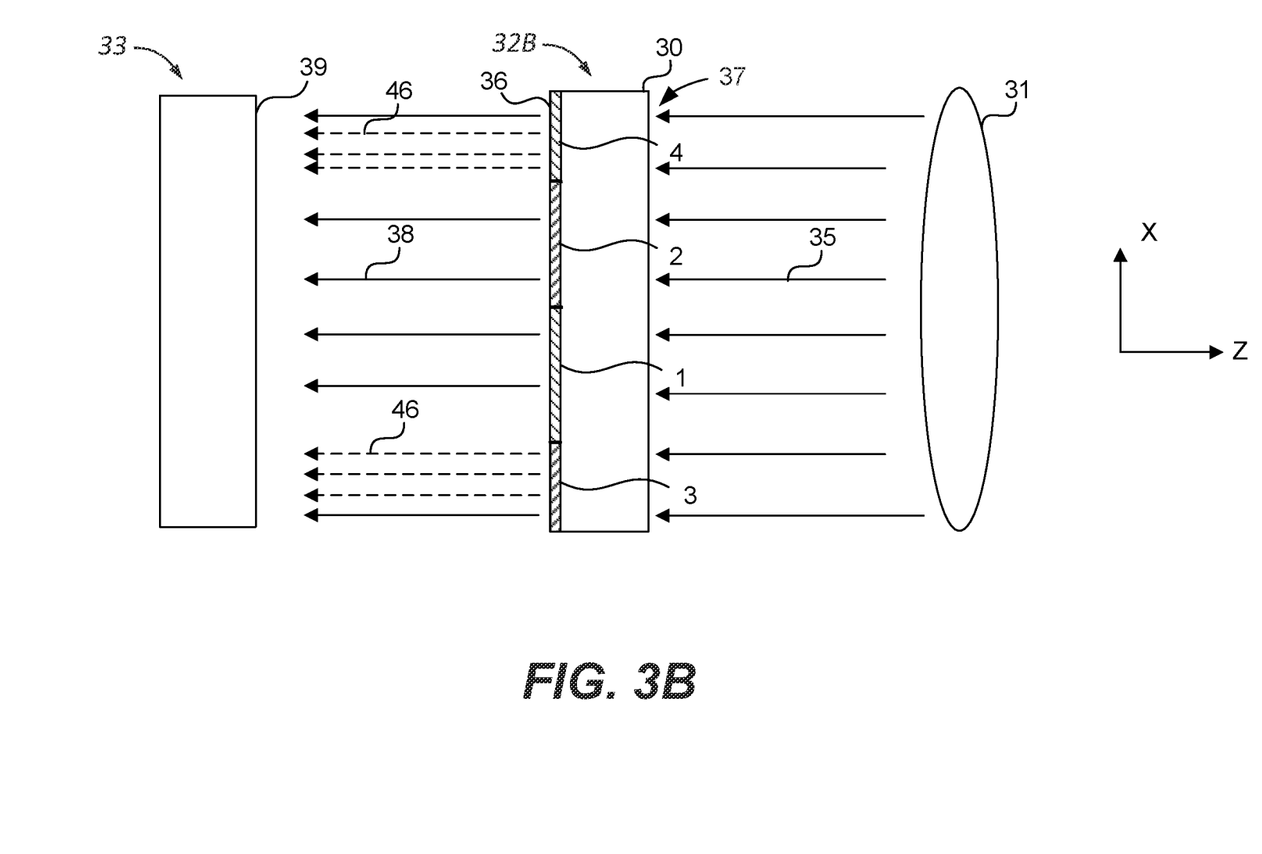
FIG. 3B schematically illustrates how a DOE according to a first second can be used to tune brightness uniformity.
Figure 3C:
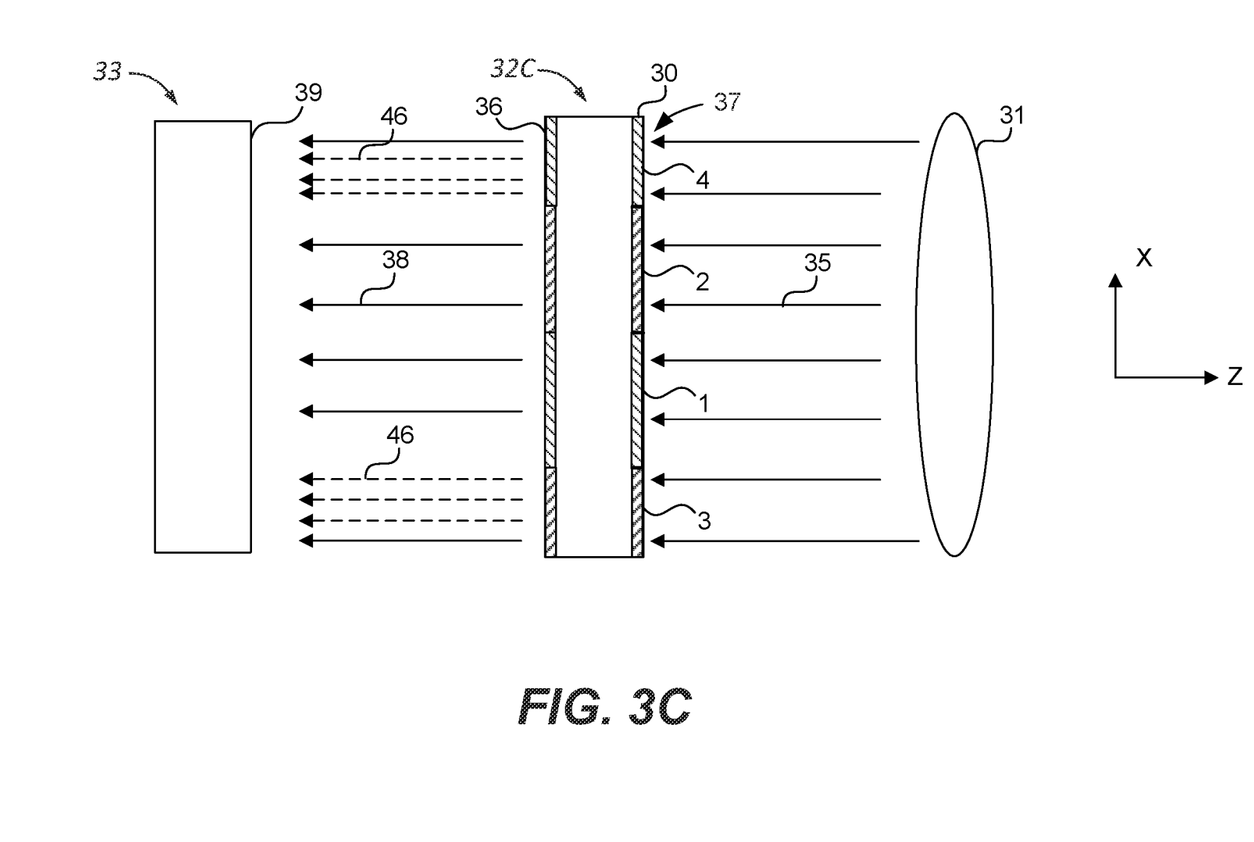
FIG. 3C schematically illustrates how a DOE according to a third embodiment can be used to tune brightness uniformity.

FIGS. 3A through 3C schematically illustrate how a DOE can be used to tune brightness uniformity. In particular, FIG. 3A shows a DOE 32 according to a first embodiment, in which only the input surface 37 has diffraction gratings. FIG. 3B shows a DOE 32B according to a second embodiment, in which only the output surface 36 has diffraction gratings. FIG. 3C shows a DOE 32C according to a third embodiment, in which both the output surface 36 and the input surface 37 have diffraction gratings.

The illustrated embodiments are suitable for situations in which it is desirable to increase the brightness around the edges of the image, both in absolute terms and relative to the center of the image. Other embodiments, however, may be based on different goals or requirements. Further, although the brightness uniformity may be tuned spatially along one dimension or multiple dimensions, for simplicity FIGS. 3A through 3C illustrate tuning along only one dimension, such as along the horizontal (x) axis of the displayed image. Hence, FIGS. 3A through 3C each can be considered to represent a schematic view from directly above those components, i.e., looking in the vertical (or negative y-axis) direction.

In FIG. 3A, the DOE 32 is disposed between a light source 31 and an imager 33 within the optical path to an eye of the user (not shown). In some embodiments this configuration may be repeated for the other eye of the user, whereas in other embodiments the same components and optical path may be common to both eyes of the user. Further, other components of the optical path are not shown, as they are not germane to this description.

Light 35 from the light source 31 impinges upon the input surface 37 of the DOE 32. Light 38 and 46 exiting the DOE 32 at the output surface 36 of the DOE 32 propagates to the imaging surface 39 of the imager 33. The light source 31 may be, for example, an LED of a particular color (e.g., red, green or blue). Additional light sources, such as for other colors, may also be present even though they are not shown. The imager 33 may be, for example, an LCOS microdisplay module. The imager 33 may be configured to selectively reflect and/or absorb the light from the light source and incident upon its imaging surface, to varying degrees, at different locations along the imager's imaging surface according to image data carried in input signals (not shown) provided to the imager 33 from control electronics (not shown).

The DOE 32 may be formed of optical-grade glass or plastic, for example. In certain embodiments, the light input surface (hereinafter simply "input surface") 37 of the DOE 32 is substantially identical in size and shape to the output surface (hereinafter simply "output surface") 36 of the DOE 32. Further, in certain embodiments the output surface 36 is opposite and parallel to the input surface 37, as shown in FIGS. 3A through 3B, and the edges of these two surfaces are rectangular and aligned with each other in the plane of the image (i.e., the x-y plane). In certain embodiments, the area in which light exits the DOE 32 at the output surface 37 is identical in size and shape to the area in which light enters the DOE 32 at the input surface 37, and the entireties of these two surfaces are used for light input/output. Further, in certain embodiments, the peripheral and central regions of these surfaces also spatially align with corresponding peripheral and central regions of the imager, respectively, in the plane of the image (i.e., x-y plane).

As shown in FIGS. 3A through 3C, various zones or regions of diffraction ("diffractions zones") 30 are implemented in the DOE. In certain embodiments, the diffraction zones 30 are surface gratings and/or Bragg gratings. In other embodiments, however, the diffraction zones of the DOE may have another form, such as volume gratings. In FIG. 3A the diffraction zones 30 are implemented on the input surface 37 of the DOE 32, although in other embodiments the diffraction zones may be implemented differently, such as on the output surface 36 as shown in FIG. 3B, or on the input surface 37 and the output surface 36 as shown in FIG. 3C, and/or within the body of the DOE. In the illustrated embodiments, the diffraction zones 30 and TIR characteristics of the DOE 32 increase the intensity (brightness) of the light output from the periphery of the DOE.

In FIG. 3A, the two central diffraction regions, i.e., regions 1 and 2, are configured partially to transmit zero-order light and partially to diffract light so that the light propagates by TIR to the peripheral regions of the DOE 32. For example, left central diffraction region 1 is configured to partially transmit zero-order light and partially to diffract light so that the light propagates via TIR to left peripheral diffraction region 3; similarly, right central diffraction region 2 is configured to partially transmit zero-order light and partially to diffract light so that the light propagates via TIR to right peripheral diffraction region 4. Peripheral diffraction regions 3 and 4 are configured mainly to transmit zero-order light and to diffract light from the nearest central diffraction region 1 or 2, respectively. The result of this configuration is that light exiting the DOE 32 in the peripheral region of the output surface 36 is brighter than light exiting the DOE 32 in the central portion of the output surface 36. Further, light exiting the DOE 32 in the periphery of the output surface 36 is brighter than the light incident to the corresponding peripheral region of the input surface 37. The dashed arrows 46 exiting the DOE 32 from right to left in FIG. 3 represent the additional light energy exiting the DOE 32 at the periphery of the output surface 36 relative to the light energy that impinged upon the DOE 32 at the periphery of the input surface 37. This effect can compensate for vignetting or other brightness non-uniformity that may otherwise be present in the design of the optics.

Figure 4:
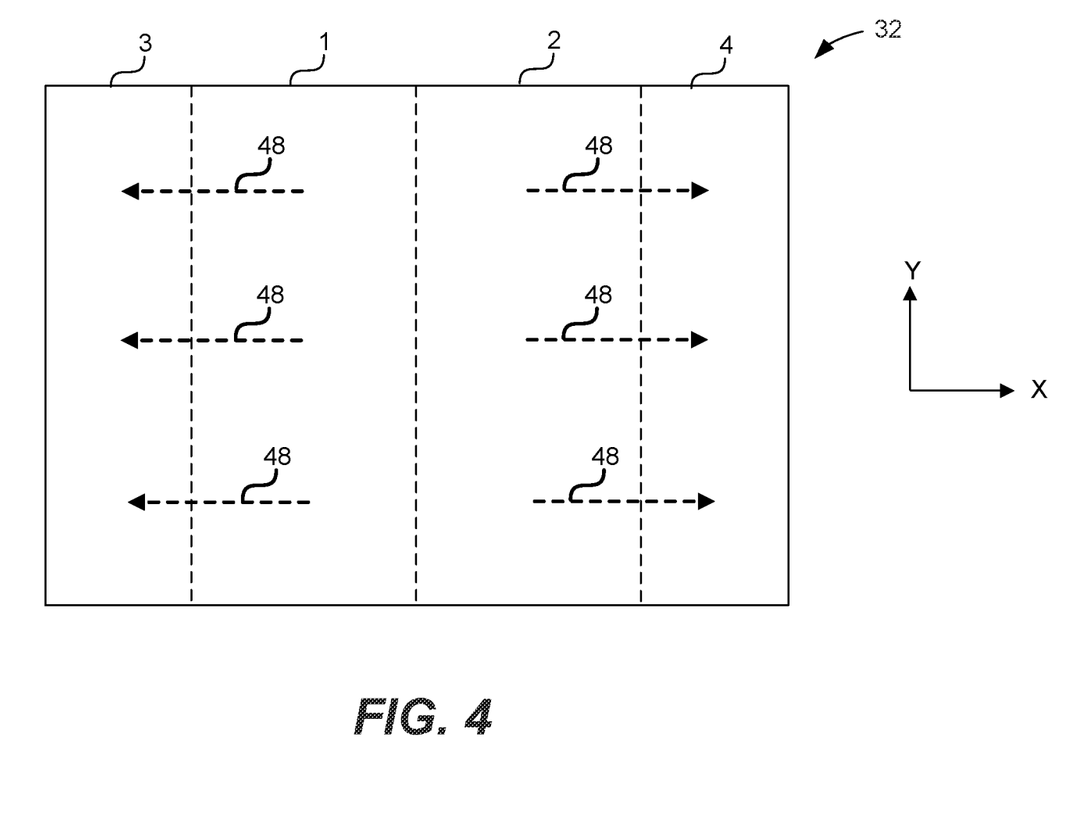
FIG. 4 schematically shows diffraction zones on a surface of the DOE, that can be used to tune brightness uniformity in one dimension.
Figure 5:
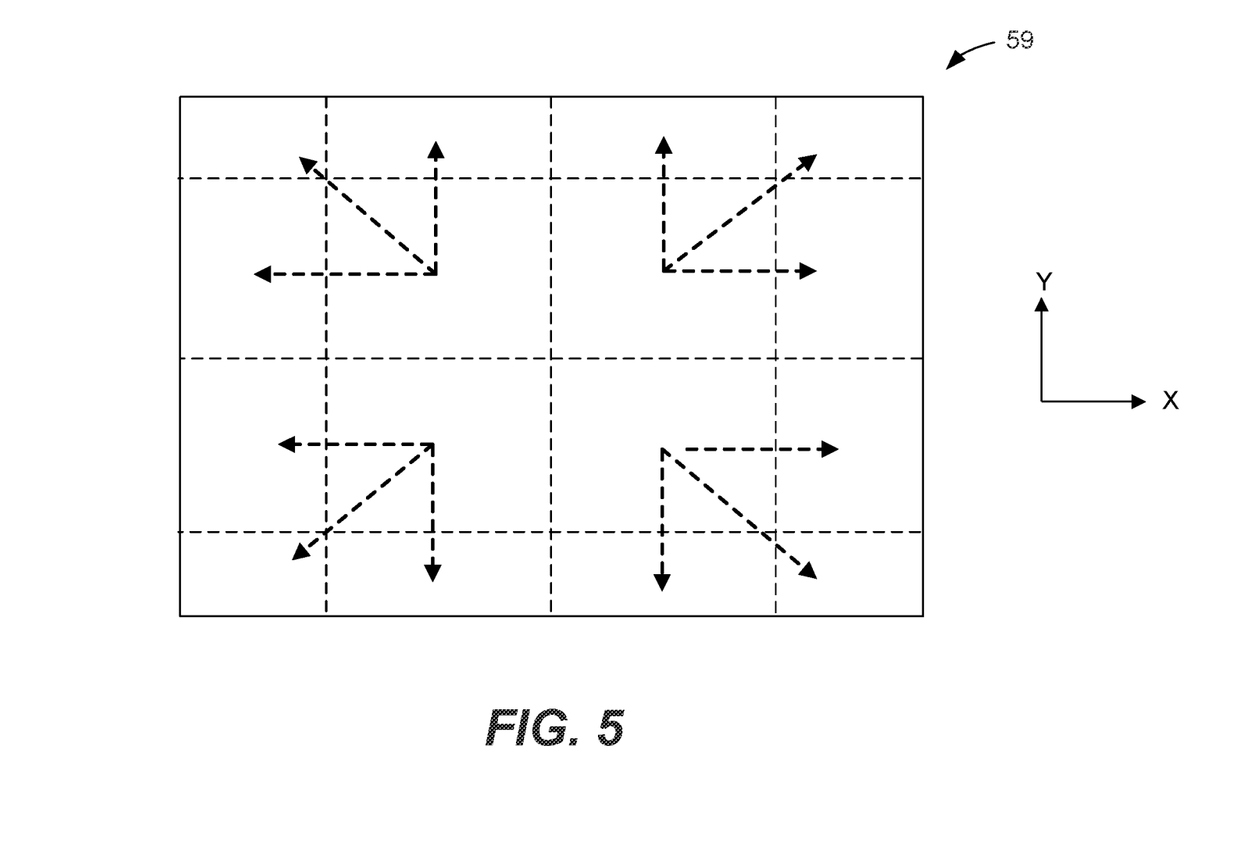
FIG. 5 schematically shows diffraction zones on a surface of the DOE, that can be used to tune brightness uniformity in two dimensions.

FIG. 4 shows a schematic view of the input surface 37 of the DOE 32 of FIG. 3 according to at least one embodiment, viewed from the direction in which light is incident upon the input surface 37 (i.e., along the z-axis). As shown, the DOE 32 includes four diffraction zones 1, 2, 3 and 4, configured to tune brightness uniformity in a single dimension, which in this example is horizontally across the display area (i.e., along the x-axis). Arrows 48 indicate the directions in which incident light in the central zones 1 and 2 is generally diffracted toward the peripheral zones 3 and 4, respectively, of the DOE 32. In other embodiments, the diffraction gratings could instead be configured to tune brightness uniformity in the vertical dimension (i.e., along the y-axis), or in both the horizontal and vertical dimensions. FIG. 5 illustrates an example diffraction zone configuration that may be used to tune brightness uniformity in both the horizontal and vertical dimensions. In FIG. 5, the input surface of a DOE 59 is divided into 16 diffraction zones, wherein each of the central (interior) zones may be configured to diffract light towards the closest peripheral diffraction zone(s). Various other diffraction zone configurations are possible, depending on the specific tuning that is desired.

Various modifications and/or extensions of the above-described technique are possible. For example, in some embodiments the diffraction zones of the DOE may be tailored to couple out only specific wavelengths of portions of the human-visible light spectrum. This type of embodiment may be desirable in, for example, display devices that include a microdisplay that prefers different wavelengths or portions of the light spectrum at different pixel locations. Consequently, the DOE can be designed such that particular regions (i.e., diffraction zones) of the output surface of the DOE are designed to couple out selected portions of the human-visible light spectrum, while other portions of the spectrum propagate further through the DOE. Further, different regions of the output surface of the DOE can be designed to couple out different selected portions of the human-visible light spectrum, such that the portions of the light spectrum that are coupled out vary as a function of spatial location in the image plane. Other variations and modifications are also possible.

Figure 6:
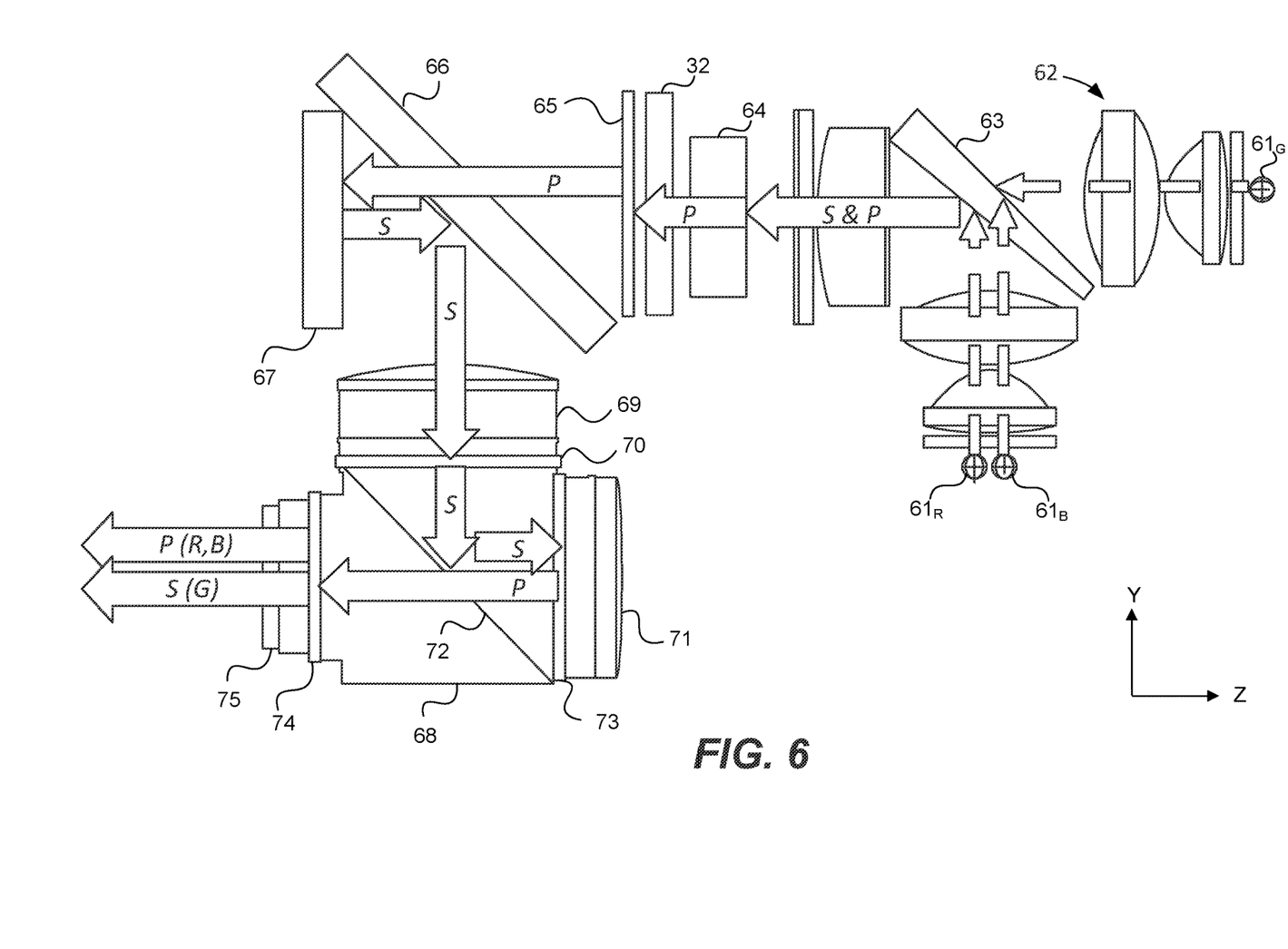
FIG. 6 illustrates an example of the optical components in an optical path of the HMD device.

FIG. 6 illustrates a more detailed example of the components that can make up an optical path in an HMD (e.g., HMD 40 of FIG. 1), showing how the above-described DOE for uniformity tuning can be included in it. The components shown in FIG. 6 may be housed within a display engine assembly, such as display engine assembly 54 in FIGS. 2A and 2B. Note that in practice, the optical path may include additional components not shown, that are not germane to this description, and/or may it omit some of the illustrated components. Also, in practice the HMD device may include separate but identical optical paths for the left eye and right eye of the user, although to simplify description only one optical path is shown in FIG. 6.

In embodiments represented by FIG. 6, the illumination sources include a red LED $61_R$, green LED $61_G$ and blue LED $61_B$, each of which produces unpolarized light (s- and p-polarized). Light from the red, green and blue LEDs is transmitted through one or more lenses 62 and then is either further transmitted (in the case of the green light) or reflected (in the case of the red and blue light) along the optical path by a dichroic mirror 63, which combines the red, green and blue light so that their paths are nominally aligned along the optical axis. The combined red, green and blue light (collectively "light") from light sources $61_R$, $61_G$ and $61_B$ propagates through additional optical elements, including a p-polarizer 64, which selectively passes through only p-polarized light, and then through a pre-polarizer 65.

In the illustrated embodiment, the DOE 32 that provides brightness uniformity tuning is located upstream from the imager 67, between p-polarizer 64 and pre-polarizer 65. In other embodiments, however, the DOE 32 could be placed at essentially any other location in the light path, including locations downstream from the imager.

Having passed through p-polarizer 64, DOE 32 and pre-polarizer 65, the light then passes through a wire grid polarizing beam splitter (PBS) 66 to impinge upon the imaging surface of the imager 67. The imager 67 may be an LCOS microdisplay module, for example, which may be controlled by image generation electronics (not shown) to selectively reflect or absorb light incident upon it, to produce an image. Note that in some embodiments, the optical path for each eye may include two or more imagers (such as imager 67). For example, multiple imagers per optical path may be used for time multiplexing of multiple images per eye, or to occlude a portion of one image generated by a first imager with another image generated by a second (or additional) imager.

Light reflected by the imager 67 is s-polarized and reflected back toward the wire grid PBS 66. The wire grid PBS 66 then reflects this light at a 90° angle downward toward a set of additional optics, including lens 69, post-polarizer 70 and another PBS 68.

The s-polarized light initially impinges upon internal interface 72 inside the PBS 68 and is reflected at a 90° angle to the right (, i.e., along the z-axis), toward a quarter-wave plate (QWP) 73 (which transmissively rotates polarization of incident light in either direction by 75 degrees) and then to the lens 71, where the light is reflected back toward interface 72 as p-polarized light. The p-polarized light is then transmitted through interface 72 and subsequently exits the PBS 68 at the left of the figure. The light exiting the PBS 68 then passes through a color-selecting polarizer (CSP) 74 to produce p-polarized red and blue light and s-polarized green light, which exits the optical path via an output lens 75. The CSP 74 rotates polarization on a wavelength-dependent basis. For example, in certain embodiments only green light polarization is altered but red and blue are nominally unaffected.

EXAMPLES OF CERTAIN EMBODIMENTS

Certain embodiments of the technology introduced herein are summarized in the following numbered examples:

1. A display device comprising: a light emitter; and a diffractive optical element (DOE) optically coupled to receive light from the light emitter and to convey the light along an optical path, the DOE having an input surface and an output surface parallel to the input surface, the input surface and the output surface each having a central region and a peripheral region, the DOE having optical characteristics such that light exiting the DOE in the peripheral region of the output surface has greater brightness than light exiting the DOE in the central region of the output surface.

2. The display device of example 1, wherein the optical properties of the DOE further are such that light exiting the DOE in the peripheral region of the output surface has greater brightness than light incident upon the peripheral region of the input surface.

3. The display device of example 1 or example 2, wherein the input surface and the output surface have identical shape and area.

4. The display device of any of examples 1 to 3, wherein all edges of the output surface are aligned with corresponding edges of the input surface in each dimension perpendicular to the optical path.

5. The display device of any of examples 1 to 4, wherein the DOE includes a diffraction grating, and the optical properties are provided, at least in part, by the diffraction grating.

6. The display device of any of examples 1 to 5, wherein the optical properties include total internal reflection.

7. The display device of any of examples 1 to 6, wherein the diffraction grating is formed at least partially in the input surface of the DOE.

8. The display device of any of examples 1 to 7, wherein the diffraction grating is formed at least partially in the output surface of the DOE.

9. The display device of any of examples 1 to 8, wherein the diffraction grating is formed in at least two of: the input surface of the DOE, the output surface of the DOE, or a body of the DOE.

10. The display device of any of examples 1 to 9, further comprising an imager disposed in the optical path to receive light emitted by the light emitter, the imager having light transmission properties and configured to dynamically modify the light transmission properties based on image data.

11. The display device of any of examples 1 to 10, wherein the central region of the output surface corresponds to a central region of the imager and the peripheral region of the output surface corresponds to a peripheral region of the imager.

12. The display device of any of examples 1 to 11, wherein the DOE is disposed upstream from the imager in the optical path.

13. The display device of any of examples 1 to 12, wherein the display device is, or is part of, a head-mounted display device.

14. The display device of any of examples 1 to 13, wherein a first region of the output surface of the DOE will couple out light in only a first selected portion of a human-visible spectrum of light.

15. The display device of any of examples 1 to 14, wherein a second region of the output surface of the DOE will couple out light in only a second selected portion of the human-visible spectrum, different from the first selected portion.

16. A display device comprising: a light emitter; an imager disposed in an optical path between the light emitter and an eye of a user of the display device and disposed to receive light emitted by the light emitter, the imager configured to selectively allow the received light to be forwarded along the optical path based on an image to be displayed and locations at which the light is received at the imager; and a light-transmissive diffractive optical element (DOE) disposed in the optical path upstream from the imager, the DOE having an input surface and an output surface opposite and parallel to the input surface, the DOE further having a central region and a peripheral region that include separate portions of the input surface and the output surface, the DOE including a diffraction grating and configured to selectively diffract and internally reflect light so that light exiting the DOE at the output surface in the peripheral region has a greater brightness than light exiting the DOE at the output surface in the central region, and so that light exiting the DOE at the output surface in the peripheral region has greater brightness than light incident upon the input surface in the peripheral region.

17. The display device of example 14, wherein the display device is, or is part of, a head-mounted display device.

18. A head-mounted display device comprising: a light emitter; an imager disposed in an optical path between the light emitter and an eye of a user of the head-mounted display device, the imager disposed to receive light emitted by the light emitter, the imager having light transmission properties and configured to dynamically modify the light transmission properties based on image data; and a diffractive optical element (DOE) optically coupled between the light emitter and the imager, the DOE having an input surface and an output surface parallel to the input surface, the input surface and the output surface each having a central region and a peripheral region, the DOE having optical characteristics such that light exiting the DOE in the peripheral region of the output surface has greater brightness than light exiting the DOE in the central region of the output surface and has greater brightness than light incident upon the peripheral region of the input surface, wherein the input surface and the output surface have identical shape and area and are aligned with corresponding edges of the input surface in each dimension perpendicular to the optical path.

19. The head-mounted display device of example 18, wherein the DOE includes a diffraction grating, and the optical properties are provided, at least in part, by the diffraction grating, and wherein the optical properties include total internal reflection.

20. The head-mounted display device of example 18 or 19, wherein the DOE includes a diffraction grating formed in at least one of: the input surface of the DOE, the output surface of the DOE, or a body of the DOE.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A display device comprising:
a light emitter; and
a diffractive optical element (DOE) having an input surface and an output surface parallel to the input surface, the input surface and the output surface each having a central region and at least one peripheral region, the DOE optically coupled to receive light from the light emitter at both the central region of the input surface and the at least one peripheral region of the input surface and to convey the light along an optical path, the DOE having optical characteristics such that light received at the central region propagates by total internal reflection to the at least one peripheral region and exits the DOE in the at least one peripheral region of the output surface having greater brightness than light exiting the DOE in the central region of the output surface, wherein the DOE includes a diffraction grating forming one or more diffraction zones in the central region that, in conjunction with the optical characteristics, increase the brightness of the light output from the at least one peripheral region.

2. The display device of claim 1, wherein the optical characteristics of the DOE further are such that light exiting the DOE in the at least one peripheral region of the output surface has greater brightness than light incident upon the at least one peripheral region of the input surface.

3. The display device of claim 1, wherein the input surface and the output surface have identical shape and area.

4. The display device of claim 3, wherein all edges of the output surface are aligned with corresponding edges of the input surface in a plane perpendicular to the optical path.

5. The display device of claim 1, wherein the optical characteristics are provided, at least in part, by the diffraction grating.

6. The display device of claim 5, wherein the diffraction grating is formed at least partially in the input surface of the DOE.

7. The display device of claim 5, wherein the diffraction grating is formed at least partially in the output surface of the DOE.

8. The display device of claim 5, wherein the diffraction grating is formed in at least two of: the input surface of the DOE, the output surface of the DOE, or a body of the DOE.

9. The display device of claim 1, further comprising an imager disposed in the optical path to receive light emitted by the light emitter, the imager having light transmission properties and configured to dynamically modify the light transmission properties based on image data.

10. The display device of claim 9, wherein the central region of the output surface corresponds to a central region of the imager and the at least one peripheral region of the output surface corresponds to a peripheral region of the imager.

11. The display device of claim 9, wherein the DOE is disposed upstream from the imager in the optical path.

12. The display device of claim 1, wherein the display device is, or is part of, a head-mounted display device.

13. The display device of claim 1, wherein a first region of the output surface of the DOE will couple out light in only a first selected portion of a human-visible spectrum of light.

14. The display device of claim 13, wherein a second region of the output surface of the DOE will couple out light in only a second selected portion of the human-visible spectrum, different from the first selected portion.

15. A display device comprising:
a light emitter;
an imager disposed in an optical path between the light emitter and an eye of a user of the display device and disposed to receive light emitted by the light emitter, the imager configured to selectively allow the received light to be forwarded along the optical path based on an image to be displayed and locations at which the light is received at the imager; and
a light-transmissive diffractive optical element (DOE) disposed in the optical path upstream from the imager, the DOE having an input surface and an output surface opposite and parallel to the input surface, the DOE further having a central region and a peripheral region that include separate portions of the input surface and the output surface, the DOE optically coupled to receive the light from the light emitter at both the central region of the input surface and the peripheral region of the input surface and to convey the light along the optical path, the DOE including a diffraction grating forming one or more diffraction zones in at least one of the central region or the peripheral region that increase a brightness of light output from the peripheral region, wherein the diffraction grating is configured to selectively diffract and internally reflect light such that light received at the central region propagates by total internal reflection to the peripheral region and exits the DOE at the output surface of the peripheral region, wherein the light exiting the DOE at the output surface of the peripheral region has a greater brightness than light exiting the DOE at the output surface in the central region, and the light exiting the DOE at the output surface in the peripheral region has greater brightness than light incident upon the input surface in the peripheral region.

16. The display device of claim 15, wherein the display device is, or is part of, a head-mounted display device.

17. A head-mounted display device comprising:
a light emitter;
an imager disposed in an optical path between the light emitter and an eye of a user of the head-mounted display device, the imager disposed to receive light emitted by the light emitter, the imager having light transmission properties and configured to dynamically modify the light transmission properties based on image data; and
a diffractive optical element (DOE) having an input surface and an output surface parallel to the input surface, the input surface and the output surface each having a central region and at least one peripheral region, the DOE optically coupled between the light, emitter and the imager to receive light from the light emitter at both the central region of the input surface and the at least one peripheral region of the input surface and to convey the light along the optical path, the DOE having optical characteristics such that light received at the central region propagates by total internal reflection to the at least one peripheral region and exits the DOE in the at least one peripheral region of the output surface having greater brightness than light exiting the DOE in the central region of the output surface and has greater brightness than light incident upon the peripheral region of the input surface, wherein the input surface and the output surface have identical shape and area and are aligned with corresponding edges of the input surface in each dimension perpendicular to the optical path, wherein the DOE includes a diffraction grating forming one or more diffraction zones in the central region that, in conjunction with the optical characteristics, increase the brightness of the light output from the at least one peripheral region.

18. The head-mounted display device of claim 17, wherein the optical characteristics are provided, at least in part, by the diffraction grating.

19. The head-mounted display device of claim 17, wherein the diffraction grating is formed in at least one of: the input surface of the DOE, the output surface of the DOE, or a body of the DOE.

* * * * *